Figure 3:
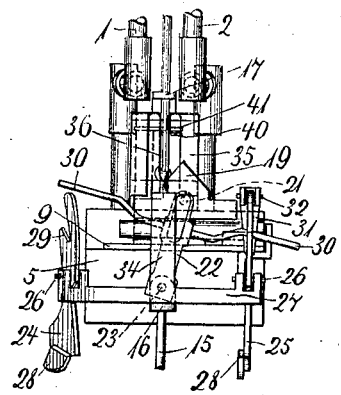

No. 872,421. PATENTED DEC. 3, 1907.
G. HIMMEL.
DEVICE FOR LIGHTING GAS LAMPS FROM A DISTANCE.
APPLICATION FILED MAY 28, 1907.
5 SHEETS—SHEET 1.
Fig. 1.
Fig. 2.
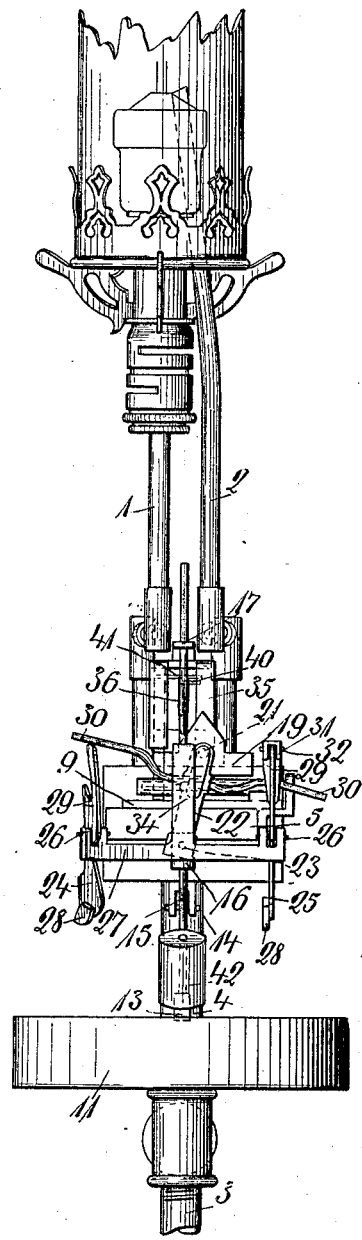
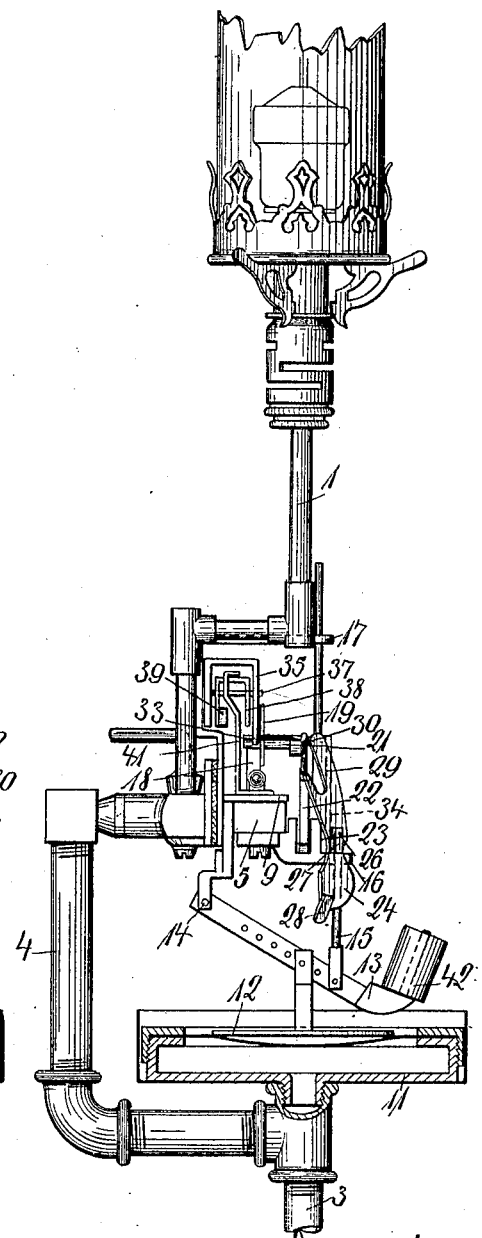

No. 872,421.  
PATENTED DEC. 3, 1907.  
G. HIMMEL.  
DEVICE FOR LIGHTING GAS LAMPS FROM A DISTANCE.  
APPLICATION FILED MAY 28, 1907.

5 SHEETS—SHEET 2.

Witnesses  
Albert Popkins  
Grace P. Brereton

Inventor  
Gottlob Himmel  
By Sturtevant & Mason  
Attorneys

No. 872,421. PATENTED DEC. 3, 1907.
G. HIMMEL.
DEVICE FOR LIGHTING GAS LAMPS FROM A DISTANCE.
APPLICATION FILED MAY 28, 1907.
5 SHEETS—SHEET 3.
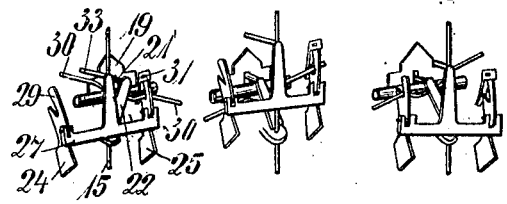
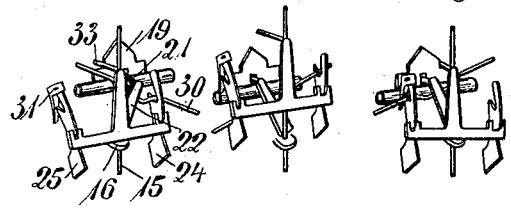
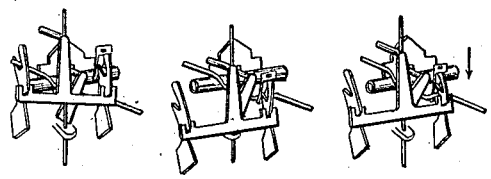
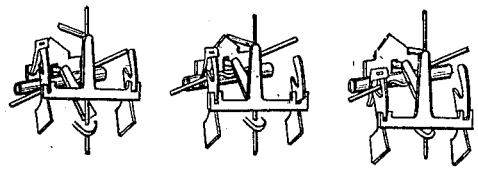

No. 872,421. PATENTED DEC. 3, 1907.
G. HIMMEL.
DEVICE FOR LIGHTING GAS LAMPS FROM A DISTANCE.
APPLICATION FILED MAY 28, 1907.

5 SHEETS—SHEET 4.

No. 872,421. PATENTED DEC. 3, 1907.
G. HIMMEL.
DEVICE FOR LIGHTING GAS LAMPS FROM A DISTANCE.
APPLICATION FILED MAY 28, 1907.

5 SHEETS—SHEET 5.

Witnesses
Albert Popkins
Grace P. Brereton

Inventor
Gottlob Himmel
By Sturtevant & Mason
Attorneys

UNITED STATES PATENT OFFICE.

GOTTLOB HIMMEL, OF TÜBINGEN, GERMANY.

DEVICE FOR LIGHTING GAS-LAMPS FROM A DISTANCE.

No. 872,421.  Specification of Letters Patent.  Patented Dec. 3, 1907.

Application filed May 28, 1907. Serial No. 376,075.

*To all whom it may concern:*

Be it known that I, GOTTLOB HIMMEL, a citizen of the German Empire, residing at Tübingen, in the Kingdom of Würtemberg, Empire of Germany, have invented certain new and useful Improvements in Devices for Lighting Gas-Lamps from a Distance; and I do hereby declare the following to be a full, clear, and exact description of the invention, such as will enable others skilled in the art to which it appertains to make and use the same.

This invention has for its object a device for enabling gas jets to be lighted and extinguished from the gas works or another central station at any desired time, serially or all together, such device being operated by a momentary impulse in the gas current in the main.

These devices are particularly adapted for cases in which a large number of jets are to be simultaneously lighted and extinguished for example street lamps, railway station lights and so-forth. In such installations it is frequently necessary however to only turn out a number of the lamps at a given time, while the other lamps must still continue to burn, which latter lamps have also to be extinguished at a later time. The lighting and extinguishing of the jets by a single shaft of the device being moved forwards and backwards causes great difficulties. These difficulties are however substantially increased by the lamps in the case of street lighting having to be extinguished or lighted serially, as in using a gas current impulse for lighting and extinguishing the jets, the first or already extinguished series is again lighted by the extinguishing of the second series of jets, whereby of course such devices are useless in practice for extinguishing several series of jets. Now this invention avoids these defects by a peculiar valve arrangement which is operated by the gas impulse and by the member regulating the gas supply being compulsorily operated in such a way that the lighting and extinguishing only takes place in the desired manner, and lighting in series may be suitably employed. The improved arrangement has not only the advantage of a great saving in cost of attendance but also of gas, as the lamps may now be lighted and extinguished according to actual requirements, so that it is possible to light them later or extinguish them earlier, for instance on a clear day. The improved arrangement has also the advantage that only a very small and suitably regulatable expenditure of power is necessary for operating it, whereby it is possible to operate a number of series instead of the two usual ones (for instance lamps intended to burn during half the night and through the entire night) by this improved lighting apparatus. For this object the valve mechanism is regulated so as to be sensitive to a suitable variation in the amount of the load. A further advantage is also hereby attained. By accidentally simultaneously lighting or extinguishing a large number of jets, a variation in the pressure is produced in the pipe, which causes the directly influenced member to be operated. With a suitable load this operation does not cause a premature temporary opening and closing of the valve, whereby an exceptionally sure action of the improved apparatus is possible, which may be further increased by the improved apparatus being moved only at the end of the return movement of the respective part. Finally by the present invention the separate parts are easily accessible and also the entire device is removable, while after its removal the lamp is still adapted to be used in the ordinary way without further alteration.

The object of this invention is shown in the accompanying drawings in certain forms of construction as an example and will now be explained.

Figure 5:
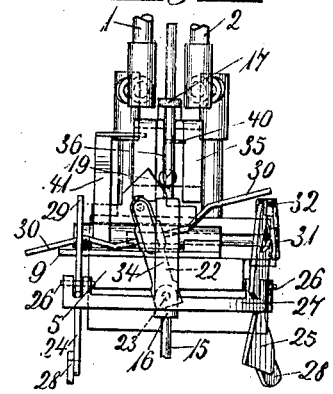
Figure 4:
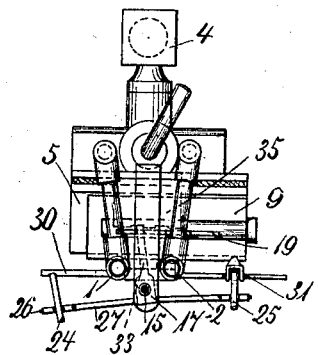
Figure 6:
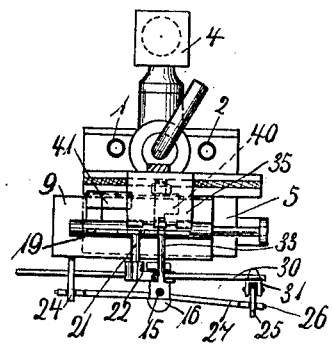
Figure 29:
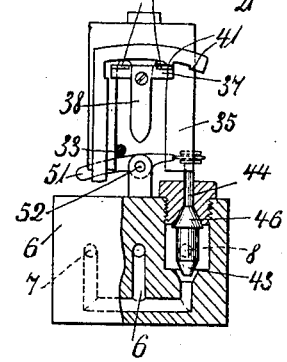
Figure 19:
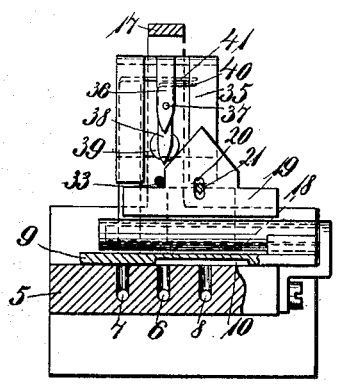
Figure 20:
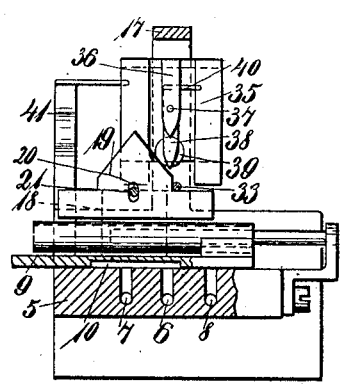
Figure 21:
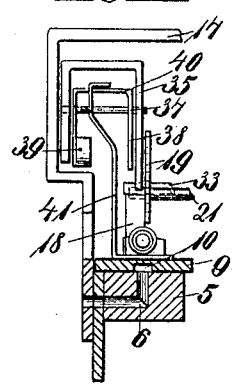
Figure 22:
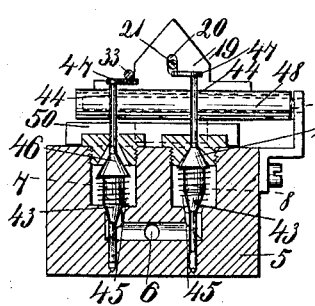
Figure 23:
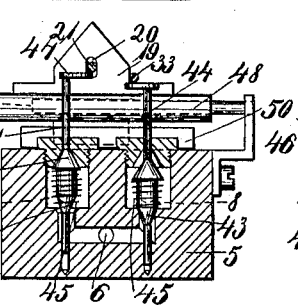
Figure 24:
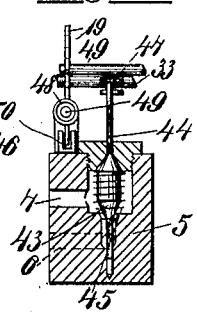
Figure 25:
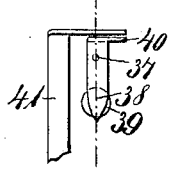
Figure 26:
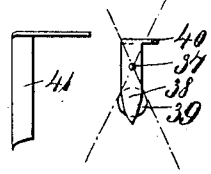
Figure 27:
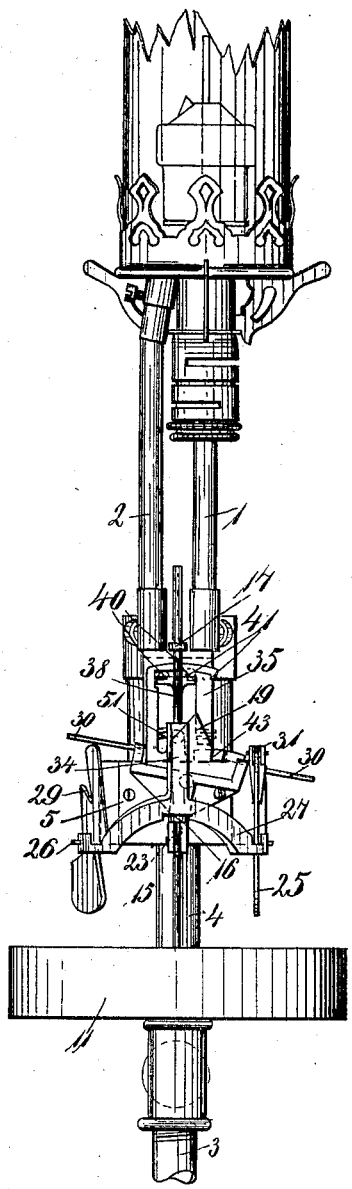

Figure 1 is a front view of the entire apparatus; and Fig. 2, a side view and partial section of same; Fig. 3 is a front view; and Fig. 4, a plan view of the governing mechanism in one end position; while Fig. 5 is a front view; and Fig. 6, a plan view of the same in the other end position; Figs. 7–12 on the one hand; and Figs. 13–18 on the other hand show both the method of working and the simultaneous position of the respective parts, of two series of lamps; Fig. 19 is a vertical sectional view of the valve mechanism on an enlarged scale showing the parts in one position; and Fig. 20, is a similar view, with the parts in another position; Fig. 21 is a lateral section of same; Figs. 22, 23 and 24 are similar views of another form of construction of the shutting off or closing mechanism; Figs. 25 and 26 show the compulsory governing device; Fig. 27 is a front view; and Fig. 28 a side view and partial section of another form of construction; and Fig. 29 is a front view on an enlarged scale of the shutting off or closing member together with a stop mechanism.

The apparatus according to the present invention comprises a main burner pipe 1 and a lighting or pilot burner pipe 2, both of which are fed from a main pipe 3. The gas flows from the latter by means of an intermediate pipe 4 to a distributing head 5 from which the gas, by means of a valve mechanism or governor in the first form of construction (Figs. 1 and 2), is conveyed alternately to the burner 1 and to the pilot flame tube 2. For this object three passages 6, 7 and 8 are provided in the head 5, all of which open into a recess 10 at its surface, and of which the passage 6 leads to the feed pipe 3, 4, the passage 7 to the burner 1 and the passage 8 to the pilot flame tube 2. A valve 9 provided with the recess 10 slides on the head 5, which recess according to the position of the slide valve 9 connects the passage 6 successively with the passages 7 and 8, so that gas may alternately flow to the burner 1 and the pilot flame tube 2 (Figs. 19 to 21), while of course the dimensions must be selected in such a way that the passage 7 or 8 respectively, which is to be closed, is only fully closed when the other is already opened, in order to prevent an entire extinction of the flame. A gas current impulse is now used for governing or operating the valve 9, which impulse is given from a central station and is capable of being regulated. For this object a diaphragm 11, a cylinder with piston or the like, is connected with the pipe 3 which diaphragm is easily lifted by the impulse pressure and its movement regulated. By means of a disk 12 resting on the diaphragm 11, a lever 13 pivotally connected with it, is lifted, which lever can pivot on a fixed pin 14. On the lever 13 a vertically movable rod 15 is also pivotally or flexibly mounted which is guided on the one hand in the arm 16 and on the other hand in a lug 17. The vertical movement produced by the current impulse is now converted into a horizontal one and also simultaneously into a turning one. The horizontal movement operates the slide valve 9. To the rear of the valve is secured an elongated block or plate 18 which is provided in the middle with a triangular cam 19 which produces the turning movement. For moving the slide valve 9, the projection has a vertically elongated slot 20 in which a pin 21 engages which is carried by an arm 22. This arm 22 is pivoted on a pin 23 which is mounted in the arm 16. If then the arm 22 be caused to rock, its pin 21 moves the valve 9 (Figs. 3 and 5). This movement of the arm 22 is brought about by means of lifters 24 and 25. These are mounted on pins 26 pivoted on a bridge piece 27 which is mounted on the rod 15. The lifters 24 and 25 are held by weights 28 in a vertical position and have at their upper ends a hooked jaw 29 with which in rising they alternately engage beneath a cross bar 30 of the arm 22 and carry the same with them, whereby this arm is caused to turn.

Now in order on the one hand to prevent the extinguishing of that series of jets, which, when the others are extinguished, may still be required to continue to burn, and on the other hand to prevent their being lit when the first are extinguished, one of the lifters 25 is provided with a guard 31 which is pivoted on a pin 32 and can be turned upwards and is also so bent that it pushes past the bar 30 in its upward movement and closes the jaw 29 of its lifter 25, which is equivalent to its non-working movement, while on descending it remains lying on the bar 30, and thereby allows its jaw to engage the same at the next movement upward. In order to allow of this and also in order to bring the lifters 24 and 25 alternately into engagement the bridge piece 27 is arranged so as to be slightly pivotal which for instance may be attained by a little play for the rod 15 at its point of connection with the lever 13. The slight oscillating movement of the lifters 24 and 25 is effected by the triangular shaped cam 19. A pin 33 which is fixed on an upwardly pointing arm 34 of the bridge 27, slides on this cam. Now when the correct current impulse arrives, the pin 33 is lifted and the cam 19 is moved. When this occurs the valve 9 together with the cam 19 is shifted so far along that the point of the cam 19 passes to the other side of the pin 33, that is to say, in the downward movement, the pin slips has no influence on the cam 19, that is to say, off the other side of the cam 19, that is to say, the bridge 27 is turned and the other lifter 24 or 25, as the case may be, comes into engagement.

In the non-working movement of the lifter 25, which takes place alternately with the working movements, in which non-working movement no movement of the valve 9 takes place, the pin 33 causes no turning movement of the bridge 27, that is to say, it must remain on the same side of the cam 19 and can only make a purely vertical movement. For this object vertical guides 35 are provided for guiding the pin 33, over the valve 9 and cam 19, which guides are formed on each side of a fixed tongue 36. Now in order to prevent the pin 33 entering the guide 35 at the wrong side of the tongue 36, a compulsory guidance for the pin 33 is provided. This consists of a tongue 38 loosely pivoting on a fixed bolt 37, which tongue is held in a vertical position by a weight 39. This tongue 38 is provided with a laterally projecting arm 40 which is covered by a projection 41' on an arm or bracket 41 that is carried by and moves with the valve 9 (Fig. 25) during the non-working movement of the lifter 25, so that the tongue 38 cannot turn and the incorrect guide 35 is closed. The bracket 41 is for this object fixed on the valve 9, so that the latter must make this movement with it and the tongue 38 is released in the other end position (Fig. 26). In this way any defective movement of the valve 9 is avoided.

The method of working of the improved arrangement will now be hereinafter described with reference to an arrangement (Figs. 7–18) by means of which a lamp is to burn during half the night and another lamp to burn during the entire night, assuming that it is intended to extinguish the first series of jets at 12 o'clock midnight and the other series at 5 o'clock in the morning.

In the series intended to burn for half the night (Figs. 7 to 12) the lifter 25 is on the pilot flame side, and in the other series on the burner side (Figs. 13 to 18); of course in practice instead of the lifters being changed, the pipes to the burner and to the pilot flame may equally well be changed. At 7 o'clock in the evening the governing or operating mechanism assumes the position shown in Figs. 7 and 13, and at the half night jet, the lifter 25 is ready to act on rod 30 and at the whole night jet the lifter 24, is ready to act to move the valve 9 at a current impulse, that is to say, to light all the jets and on this movement the parts assume the positions shown in Figs. 8 and 14. On the cessation of the pressure in the pipe, the bridge 27 descends together with the two lifters 24 and 25 and the pin 33 engaging cam 19 during its descent is turned in the manner depicted, so that at the half night jet the lifter 24 (Fig. 9) and at the whole night jet the lifter 25 (Fig. 15) now come into position under the rod 30. In the following lifting movement the lifter 24 comes into action and operates the valve (Fig. 10), while the lifter 25, the jaw 29 of which is closed by the guard 31, slips off and passes the cross bar 30, and thus is turned back somewhat but only for this moment (Fig. 16). A non-working movement is thus executed, that is to say, the whole night lamp is not extinguished. There takes place however in this lamp no turning of the bridge 27 on the descent of the lifter, as the cam 19 remains stationary and accordingly the pin 33 is only moved in the same vertical guide 35 in which it previously traveled. On the other hand on the descent of the bridge 27 the guard 31 rubs over the cross bar 30 and is gradually turned upwards (Fig. 17), so that on the next movement at 5 o'clock in the morning, the jaw 29 engages the lifter 25 (Fig. 18) and operates the slide, that is to say, the whole night jet is shut off (Fig. 18) whereupon the parts on the next descent again return to the position shown in Fig 13, so that the operation can be repeated. In the same way at 5 o'clock in the morning the lifter 25 on the half night lamp has executed a non-working movement (Fig. 11), as otherwise the gas inlet would be opened, and has again returned to the initial position shown in Fig. 7.

The lever 13 may be loaded by weights 42 of different gravity being laid thereon, whereby the sensitiveness of the valve mechanism is variable. This arrangement allows of a larger number of series of jets being extinguished by their being loaded with weights of different sizes according to the time at which they are to be extinguished, whereby they work under a different pressure in the pipe. Those lamps which are to be last extinguished have of course the heaviest load, and those which are to be extinguished first the lightest load. When these are to be extinguished a pressure is sent into the pipe corresponding to their load, and by which the others are not affected. Now if the second series of jets are to be extinguished, a pressure is sent into the pipe corresponding to their load, and so forth.

Instead of the slide arrangement, a lift valve arrangement may also be employed (Figs. 22–24). In this form of construction, the passages to the burner 1 and the pilot jet 2 are governed by valves 43, which in a lowered position close the passages 7 and 8 respectively. These valves 43 are provided with rods 44 projecting from the distributing head 5 and are under the action of springs 45 or counterweights, which tend to press the valve 43 upwards and to open the passages 7 and 8 respectively. They are also formed as double valves, so that on opening they close in a most effective way with a second cone 46 the passage for their rods 44 through the distributer head 5, without the use of stuffing boxes. The depression is operated by means of the pin 33 which on its descent encounters a disk 47 of the respective valve. The projection 19 is in this example of construction only arranged on a slide 48 which slides on a fixed rod 49 and is prevented from tilting up by means of a fork.

Where a constantly burning pilot flame is employed the arrangement is simplified as only a single valve 43 is arranged (Figs. 27–29), which in similar manner is operated by a pin 33. The valve 43 is then connected with a lever 51 which may be loaded to correspond with the pressure in the pipe and is pivotal on a bolt 52.

Figure 28:
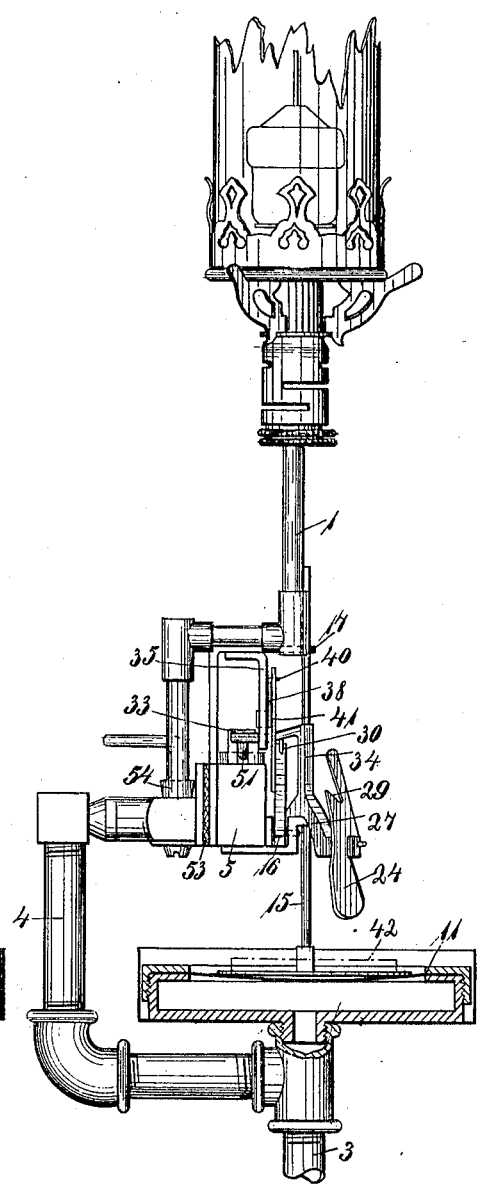

The valve mechanism is shown in Figs. 27–29 in another form of construction, which however is also applicable with slight alterations to the arrangement shown in Figs. 1–26. Here the projection 19 itself is made pivotal and adjustably dependent on the pin 23. There is also only a single movable tongue 38 provided, which again turns on a bolt 37 and is held in vertical position and also returned to this vertical position by a weight 39. The tongue 38 is here provided with two arms 40, which again according to the position of the stop 41 which is here arranged as a double stop, are overlapped in order to arrest the tongue 38 on one side.

The entire arrangement is releasably mounted on a flange 53 of the pipe 4, so that it may be rapidly removed, for instance in order to effect repairs. The pipe 4 is therefore provided with a tap 54, whereby the lamps or the like may be also used in the ordinary way without interrupting the working.

I declare that what I claim is:—

1. In apparatus of the class described, a main burner tube, a pilot flame tube, a gas supply tube, and a slide valve operated by variation in pressure in the gas-supply tube for placing the gas supply tube alternately in communication with the main burner tube and the pilot lamp tube.

2. In combination, a gas supply tube, and a main burner tube, a pilot flame tube, a slide valve operated by pressure in the gas supply tube and arranged to cut off communication between the supply tube and main burner tube and establish communication between the supply tube and the pilot flame tube, and mechanism for preventing reshifting of the valve to the opposite position on the next impulse of the pressure operated means.

3. In a system of the class described, a pair of burners arranged to be ignited simultaneously and extinguished at different times, respectively, controlling valves arranged at the burners, means under the control of and operated by the pressure in the gas supply pipes and uniform for all burners for shifting the valves, and means located at the burner first extinguished for preventing reignition of such burner when the pressure of gas is increased to extinguish the second burner.

4. In apparatus of the class described, a main burner tube, a pilot flame tube, a gas supply pipe, a ported slide valve controlling communication between the supply pipe and the two tubes, a diaphragm actuated by pressure in the supply pipe, a pivoted rocker arm connected to the valve, a two-armed rod extending from the rocker arm, a pair of members actuated by the diaphragm and arranged to engage the arms of the rod to shift the valve, and means for controlling the engagement of the members with said arms.

5. In combination, a main burner tube, a pilot flame, a gas supply pipe, a pressure actuated diaphragm connected in the supply pipe, a valve controlling communication between the supply pipe, the main burner tube and the pilot flame tube, a rocker arm connected to the valve, a two-armed rod carried by said rocker arm, a bridge or cross bar receiving movement from the diaphragm, a pair of rod engaging members carried by said bridge or cross bar, and means for operating said bridge or cross bar to control the engagement of said members with the arms of the rod.

6. In combination, a main burner tube, a pilot flame tube, a gas supply pipe, a gas pressure actuated diaphragm, a valve controlling communication between the gas supply pipe, the main burner tube, and the pilot flame tube, a rocker arm for actuating said valve, a two armed rod carried by said rocker arm, a bridge or cross piece receiving movement from the diaphragm, a pair of pivotally mounted members carried by said bridge or cross piece and having jaws for engagement with the arms of the rod, and a guard carried by one of said members for closing the jaws and preventing engagement of said members with the arm except on alternate movements.

7. In combination, a main burner tube, a pilot flame tube, a gas supply pipe, a gas pressure actuated diaphragm, a valve controlling communication between the supply pipe, the main burner tube, and the pilot flame tube, a rocker arm for actuating the valve, a two armed rod carried by the rocker arm, a bridge or cross piece receiving movement from the diaphragm, a pair of rod actuating members carried by the bridge and having rod engaging jaws, and a guard pivoted to one of said members and arranged to close the jaw, said guard being movable by engagement with the rod to open the jaw and permit operation of such rod on the jaw on alternate movements of the latter.

8. In combination, a main burner tube, a pilot flame tube, a gas supply pipe, a gas pressure actuated diaphragm, a valve controlling communication between the supply pipe, the main burner tube and the pilot flame tube, a rocker arm for shifting the valve, a two armed rod carried by said rocker arm, a bridge or cross piece receiving movement from the diaphragm, a pair of members carried by said bridge and arranged to engage and actuate the rod, a cam carried by the valve, and a projecting pin extending from the bridge and arranged to engage the cam and thereby oscillate the bridge and control the engagement of the rod actuating members with the rod.

9. In combination, a gas supply pipe, a main burner tube, a pilot flame tube, a gas pressure actuated diaphragm, a valve controlling communication between the gas supply tube, the main burner tube, and the pilot flame tube, a rocker arm for actuating said valve, a two armed rod carried by the rocker arm, a bridge or cross piece receiving movement from the diaphragm, a pair of rod engaging members, carried by said bridge, a cam carried by the valve, a pin projecting from the bridge and arranged to engage the cam to effect oscillatory movement of the bridge and thereby control engagement of the rod actuating members with the rod, a pair of pin guiding slots controlling the swinging movement of the pin, a pivoted guard tongue at the entrance slot, and means carried by the valve for locking said tongue from movement in one position of the valve and for releasing said tongue in the other position of the valve.

In testimony whereof I affix my signature, in presence of two witnesses.

GOTTLOB HIMMEL.

Witnesses:
HERMANN HOPPE,
JEAN GULDEN.